United States Patent
Mazooji

(10) Patent No.: US 10,505,254 B2
(45) Date of Patent: Dec. 10, 2019

(54) ANTENNA DESIGN FOR ACTIVE LOAD MODULATION IN A NEAR FIELD COMMUNICATION TRANSPONDER DEVICE

(71) Applicant: STMicroelectronics, Inc., Coppell, TX (US)

(72) Inventor: Mohammad Mazooji, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 137 days.

(21) Appl. No.: 15/662,440

(22) Filed: Jul. 28, 2017

(65) Prior Publication Data
US 2019/0036199 A1    Jan. 31, 2019

(51) Int. Cl.
| | | |
|---|---|---|
| *H01Q 7/00* | (2006.01) | |
| *H01Q 1/22* | (2006.01) | |
| *H01Q 1/27* | (2006.01) | |
| *H01Q 9/04* | (2006.01) | |
| *G06K 19/077* | (2006.01) | |
| *H04B 5/00* | (2006.01) | |

(52) U.S. Cl.
CPC ..... *H01Q 1/2225* (2013.01); *G06K 19/07783* (2013.01); *H01Q 1/273* (2013.01); *H01Q 7/00* (2013.01); *H01Q 9/0478* (2013.01); *H04B 5/0087* (2013.01)

(58) Field of Classification Search
CPC ........ H01Q 1/2225; H01Q 7/00; H01Q 1/273; H01Q 9/0478; H04B 5/0087; G06K 19/07783

USPC .......................................................... 343/744
See application file for complete search history.

(56) References Cited

U.S. PATENT DOCUMENTS

| | | | |
|---|---|---|---|
| 8,711,047 B2 * | 4/2014 | Tran ..................... | H01Q 1/2266 343/742 |
| 9,576,237 B2 | 2/2017 | Kunc et al. | |
| 10,312,716 B2 * | 6/2019 | Jeong ..................... | H02J 7/025 |
| 2013/0241302 A1 | 9/2013 | Miyamoto et al. | |
| 2014/0168019 A1 | 6/2014 | Hirobe et al. | |
| 2015/0207207 A1 | 7/2015 | Park et al. | |
| 2015/0303568 A1 * | 10/2015 | Yarga ..................... | H01Q 5/321 343/720 |
| 2017/0084991 A1 * | 3/2017 | Mayo ..................... | H01Q 1/526 |

(Continued)

FOREIGN PATENT DOCUMENTS

| | | |
|---|---|---|
| WO | 2010025156 A1 | 3/2010 |
| WO | 2010093997 A1 | 8/2010 |

OTHER PUBLICATIONS

EPO Search Report and Written Opinion for co-pending EP Appl. No. 18183874.9 dated Nov. 21, 2018 (7 pages).

(Continued)

*Primary Examiner* — Hai V Tran
(74) *Attorney, Agent, or Firm* — Crowe & Dunlevy

(57) ABSTRACT

A near field communications (NFC) transponder includes a transmit circuit coupled to a transmit antenna and a receive circuit coupled to a receive antenna. The transmit/receive antennae are configured such that no signal is induced on the receive antenna by operation of the transmit antenna. Advantageously, this permits continued reception by the receive antenna while the transmit antenna is used for transmission using active load modulation.

19 Claims, 4 Drawing Sheets

(56) References Cited

U.S. PATENT DOCUMENTS

2017/0133744 A1* 5/2017 An .................... H01P 11/00

OTHER PUBLICATIONS

Gebhart, Michael et al.: "Active Load Modulation for Contactless Near-Field Communication," IEEE 2012 Intern. Conf. of RFID Technologies and Applications (2102), pp. 228-233.

* cited by examiner

ANTENNA DESIGN FOR ACTIVE LOAD MODULATION IN A NEAR FIELD COMMUNICATION TRANSPONDER DEVICE

TECHNICAL FIELD

The present invention relates to Near Field Communication (NFC) technologies and more particularly, to an antenna design for use in an NFC transponder device.

BACKGROUND

Near Field Communication (NFC) technologies enable contactless communications between devices. The number of applications, along with the corresponding market, for NFC systems grows on a daily basis. The conventional NFC system includes a reader terminal on one side of a contactless communications interface and a plurality of transponders on the other side of the contactless communications interface. An RF identification (RFID) tag is just one example of an NFC transponder device. In many cases, the transponder is a battery-less device that receives power over the contactless communications interface from the reader terminal. Data is communicated from the transponder to the reader terminal using well known passive load modulation (PLM) techniques. In passive load modulation, the transponder harvests some of the field power of the reader terminal and uses that power to modulate the amount of load that the reader terminal antenna senses.

Alternatively, an active transmission of data from the transponder to the reader terminal can be made through the use of active load modulation (ALM). To accomplish active load modulation, the transponder makes an RF transmission that is either in phase with or 180° out of phase with the field of the reader terminal. When the transponder field is in phase with the reader field, there is an increase in voltage at the reader antenna terminals that is sensed by the reader as the transmitted data. Conversely, when the transponder field is 180° out of phase with the reader field, there is a decrease in voltage at the reader antenna terminals that is sensed by the reader as the transmitted data.

In the past few years, a trend has emerged toward enabling NFC functionality on very small devices (such as wearables and mobile phones). The integration of NFC technology into such small devices necessitates the use of an antenna having a relatively speaking small occupied area or volume. As a result, passive load modulation is not feasible. Instead, active load modulation is needed. However, because the transponder antenna is smaller the transponder may not be able to harvest enough energy from the reader field. This is due to insufficient coupling between the transponder antenna and the reader antenna and further because the same antenna is being used in the transponder during transmission.

SUMMARY

In an embodiment, a near field communications (NFC) transponder comprises: a transmit circuit having a first output and a second output; a receive circuit having a first input and a second input; a transmit antenna having a first antenna segment coupled between the first and second outputs of the transmit circuit and a ground node and a second antenna segment coupled between the first and second outputs of the transmit circuit and the ground node; and a receive antenna having a first antenna terminal coupled to the first input of the receive circuit and a second antenna terminal coupled to the second input of the receive circuit; wherein the first antenna segment of the transmit antenna extends parallel to a first portion of the receive antenna and wherein the second antenna segment of the transmit antenna extends parallel to a second portion of the receive antenna.

In an embodiment, a near field communications (NFC) transponder comprises: a transmit circuit; a receive circuit having a first input and a second input; a transmit antenna electrically coupled to an output of the transmit circuit, the transmit antenna having a first antenna segment coupled between the output of the transmit circuit and a ground node and a second antenna segment coupled between the output of the transmit circuit and the ground node; and a receive antenna loop electrically coupled to an input of the receive circuit; wherein the first antenna segment of the transmit antenna extends parallel to a first portion of the receive antenna loop and wherein the second antenna segment of the transmit antenna extends parallel to a second portion of the receive antenna loop.

In an embodiment, a near field communications (NFC) transponder comprises: a transmit circuit having a first output and a second output; a receive circuit having a first input and a second input; a transmit antenna having a first antenna segment coupled in series with a second antenna segment between the first and second outputs of the transmit circuit; and a receive antenna having a first antenna terminal coupled to the first input of the receive circuit and a second antenna terminal coupled to the second input of the receive circuit; wherein the first antenna segment of the transmit antenna extends parallel to a first portion of the receive antenna and wherein the second antenna segment of the transmit antenna extends parallel to a second portion of the receive antenna.

BRIEF DESCRIPTION OF THE DRAWINGS

The accompanying drawings are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
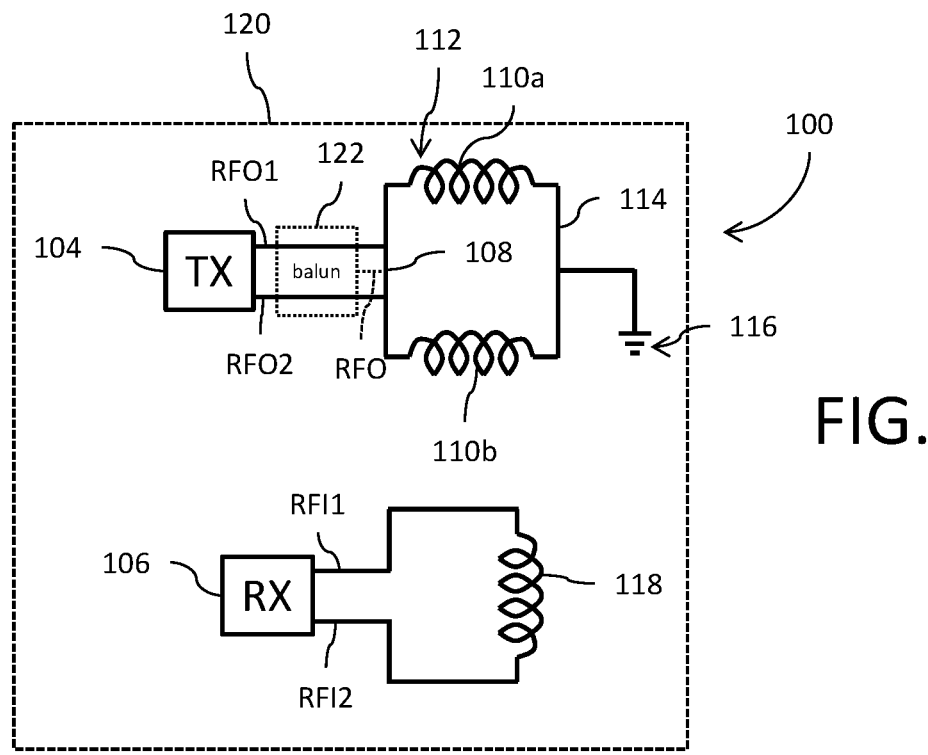
FIG. 1 shows a block diagram of a transponder having a dual antenna arrangement for use in Near Field Communication (NFC) applications.

Reference is made to FIG. 1 which shows a block diagram of a transponder 100 having a dual antenna arrangement for use in Near Field Communication (NFC) applications. The transponder includes a transmit (TX) circuit 104 and a receive (RX) circuit 106. The transmit circuit 104 includes RF output terminals RFO1 and RFO2 directly electrically connected together by circuit 108 and directly electrically connected to a first end terminal of a first (segment) portion 110a of a transmit antenna 112 and directly electrically connected to a first end terminal of a second (segment) portion 110b of the transmit antenna 112. The second end terminals of the first and second (segments) portions 110a and 110b are directly electrically connected together by circuit 114 and further directly electrically connected to a ground node 116. The receive circuit 106 includes RF input terminals RFI1 and RFI2 connected to a corresponding first end terminal and second end terminal, respectively, of a receive antenna 118. The transponder 100 is contained within a portable electronic device 120 comprising, for example, a cellular (mobile) telephone or a human wearable device such as a watch or an exercise tracker.

In an implementation of the transmit circuit 104 where the RF output terminals RFO1 and RFO2 cannot be directly electrically connected together due to the transmit circuit electrical configuration, a balun 122 can instead be used with (balanced) inputs coupled to the RF output terminals RFO1 and RFO2 and a single-ended (unbalanced) output RFO to which the first end terminals of the first and second (segments) portions 110a and 110b of the transmit antenna 112 are directly electrically connected.

The impedances of the transmit antenna 112 and the receive antenna 118 are defined in accordance with the input and output impedance requirements of the terminals RFO1, RFO2, RFO, RFI1 and RFI2. Alternatively, a matching network will transfer the impedances of RFO1, RFO2, RFO, RFI1, and RFI2 to the impedance of the transmit antenna 112 and receive antenna 118.

Figure 2A:
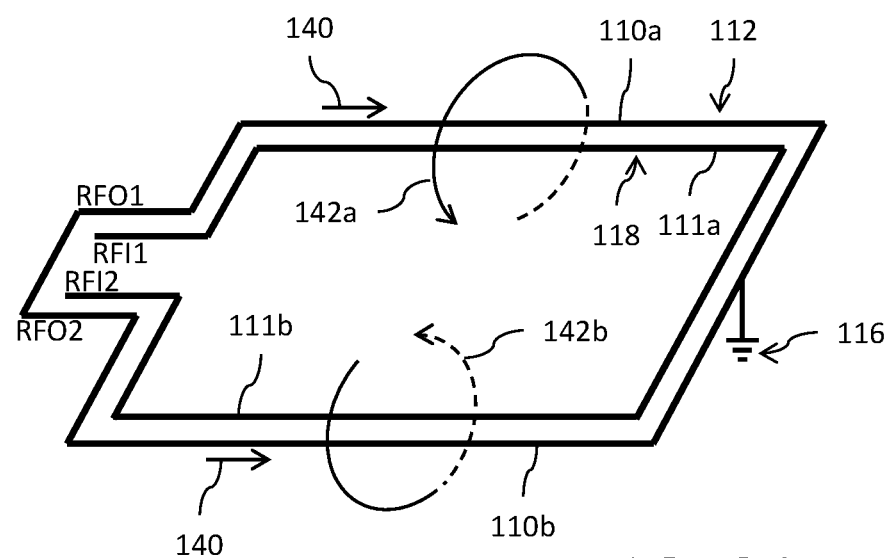
FIGS. 2A-2B show examples for the physical arrangement of the transmit antenna and the receive antenna of FIG. 1.

FIG. 2A shows an embodiment for the physical arrangement of the transmit antenna 112 and the receive antenna 118. The transmit antenna 112 comprises at least a single turn of wire forming a loop between the terminals RFO1, RFO2 (or a loop connected to terminal RFO). The loop includes the first (segment) portion 110a and the second (segment) portion 110b, wherein the first (segment) portion 110a extends between the terminals RFO1, RFO2, RFO and ground node 116 and the second (segment) portion 110b extends between the terminals RFO1, RFO2, RFO and ground node 116 (and thus is electrically connected in parallel to the first (segment) portion 110a). The one or more turns of the transmit antenna 112 loop are arranged in a first plane. The receive antenna 118 also comprises at least a single turn of wire forming a loop between the terminals RFI1 and RFI2, and includes a first portion 111a extending parallel to the first (segment) portion 110a and a second portion 111b extending parallel to the second (segment) portion 110b. The one or more turns of the receive antenna 118 loop are arranged in a second plane. In an embodiment, the first and second planes are parallel to each other. In a more particular implementation, the first and second planes are coplanar (i.e., they are in the same plane). In a preferred implementation with the antennae planes either parallel or coplanar as shown in FIG. 2A, the transmit antenna 112 loop surrounds the receive antenna 118 loop.

Figure 2B:
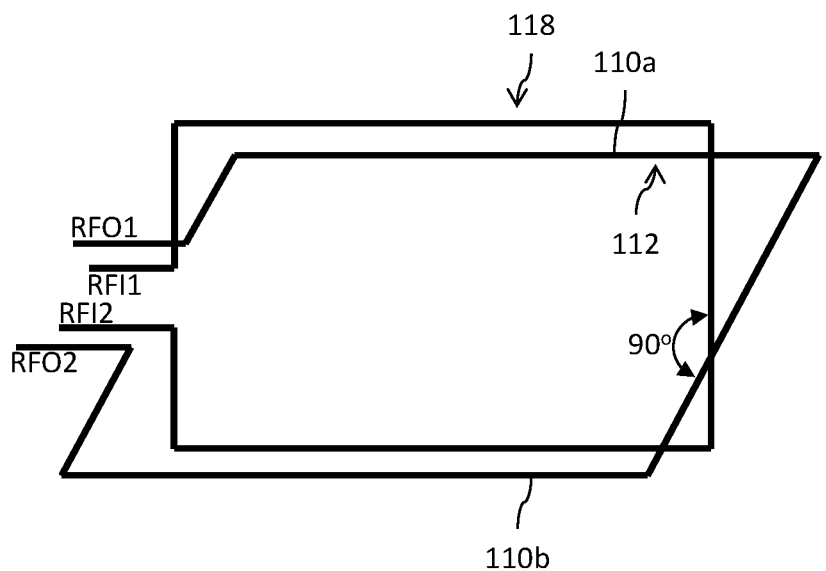

In an alternative implementation, as shown in FIG. 2B, the first and second planes may be perpendicular to each other, in which case the ground node 116 connection of the transmit antenna 112 is not needed and transmit antenna segments 110a, 110b can be individually connected to RFO1 and RFO2, respectively. The connection 108 is not needed in this implementation.

Figure 3A:
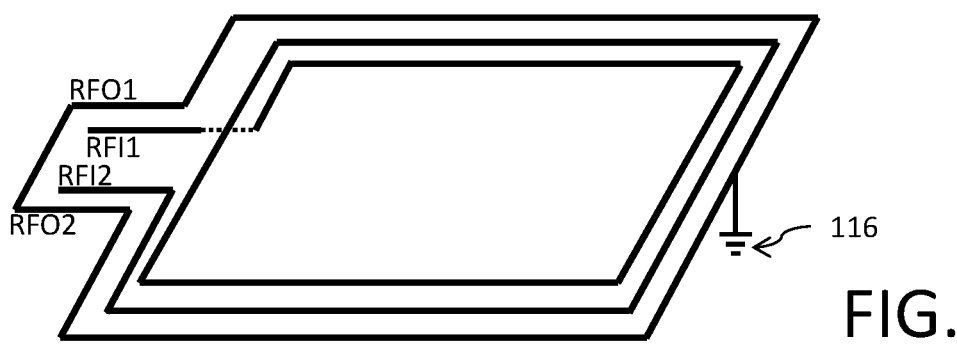
FIGS. 3A-3C show use of a multi-turn antenna configuration for one or more of the transmit antenna and receive antenna as shown in FIG. 2A.
Figure 3B:
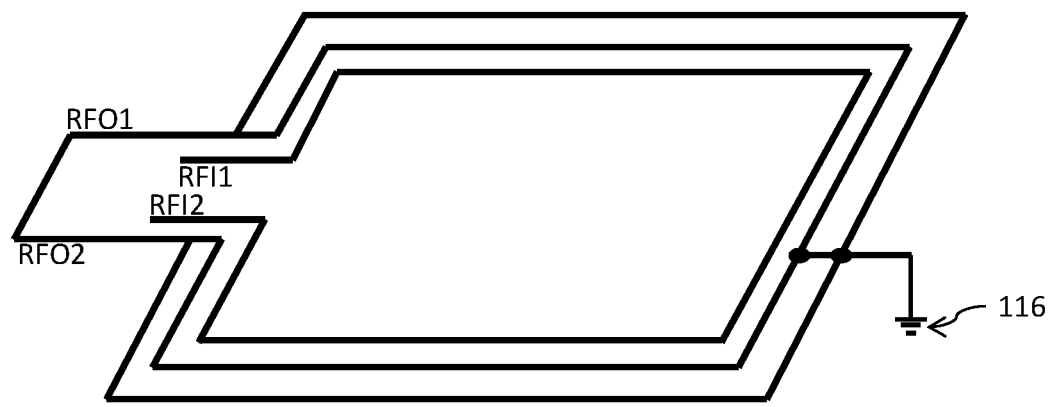
Figure 3C:
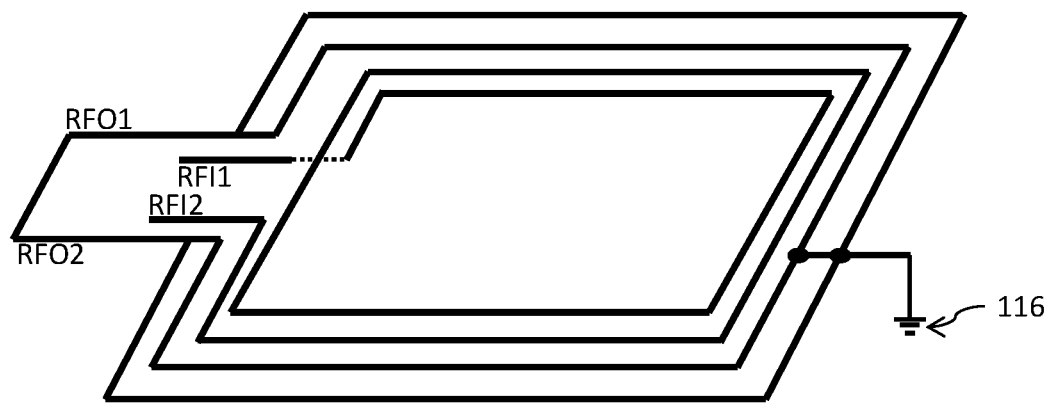

Although FIGS. 2A and 2B illustrate a particular implementation where only single turn antennae loops are used, it will be understood that this is just one example. In an embodiment as shown in FIG. 3A, the transmit antenna 112 comprises a single turn antenna loop and the receive antenna 118 is a multi-turn (for example, spiral winding) antenna loop. The implementation of FIG. 3B shows the transmit antenna 112 as a multi-turn antenna (for example, spiral winding) loop and the receive antenna 118 as a single turn antenna loop. The implementation of FIG. 3C shows the transmit antenna 112 as a multi-turn (for example, spiral winding) antenna loop and the receive antenna 118 as a multi-turn (for example, spiral winding) antenna loop. The implementations using one or more multi-turn (for example, spiral winding) antenna loops are equally applicable for use in connection with the perpendicular plane configuration of FIG. 2B.

The arrows 140 show the direction of current flow in the first portion 110a and the second portion 110b of the transmit antenna 112. This current flow produces magnetic field lines 142a and 142b, respectively, which cancel each other and thus do not induce a signal on the receive antenna 118. Because no signal is induced by the transmit antenna 112 on the receive antenna 118 due to current flow in the transmit antenna 112, the receive circuit 106 can continuously monitor the reader terminal field during transmit circuit 104 operation and thus function to receive signals from the reader terminal and maintain synchronization with the reader terminal without interruption.

Figure 4:
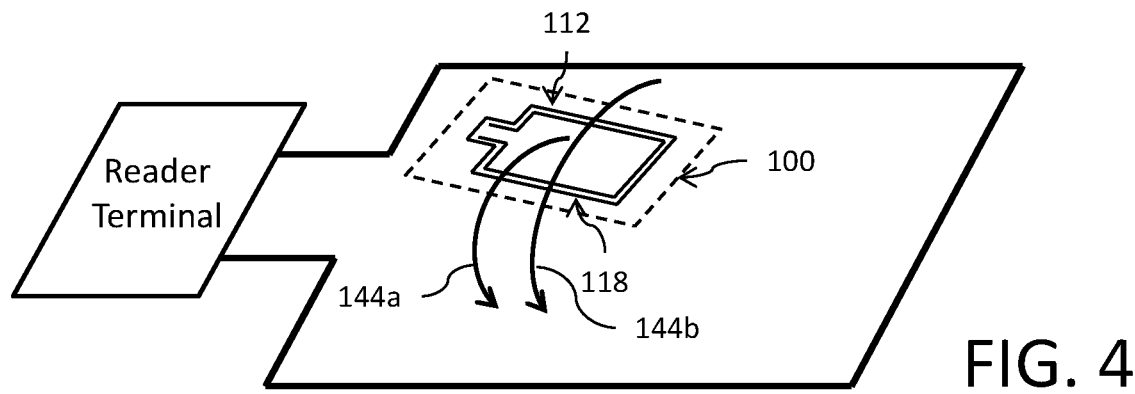
FIG. 4 illustrates the relative size difference and magnetic relationship between the antennae of the transponder and the antenna of a reader terminal.

As previously noted, the integration of NFC functionality on very small devices (such as wearables and mobile phones) necessitates the use of small antennae for the transmit antenna 112 and the receive antenna 118. Indeed, FIG. 4 provides a general indication of the relative size difference between the transmit antenna 112 and the receive antenna 118 in comparison to reader terminal antenna 150. It will be understood that FIG. 4 does not necessarily show a scale size relationship, but rather illustrates the relative size relationship where the planar area occupied by the transmit antenna 112 and the receive antenna 118 in the transponder 100 is much smaller than the planar area occupied by the reader terminal antenna 150. At this level, the current flow in the first portion 110a and the second portion 110b of the transmit antenna 112 produces magnetic field lines 144a and 144b, respectively, which add to each other so as to induce a signal on the reader terminal antenna 150.

Because a passive linear system is used, the positions of the antennae shown in FIG. 1 can be exchanged.

Figure 5A:
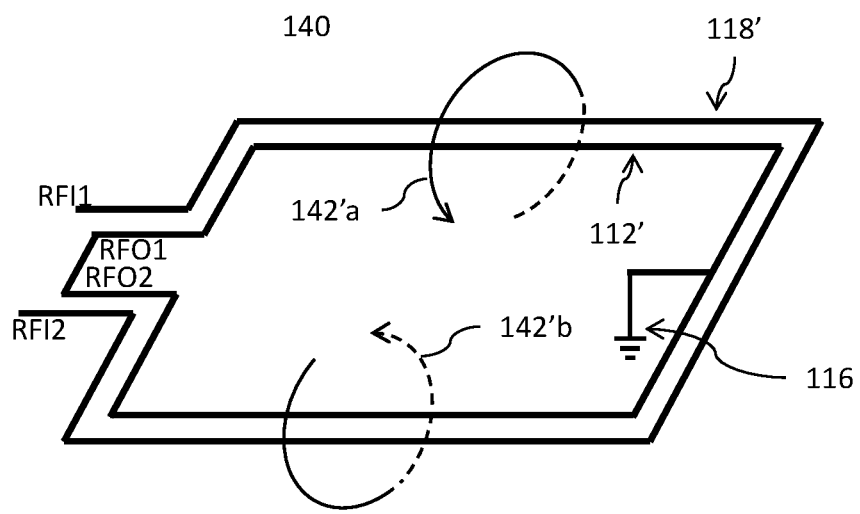
FIGS. 5A-5B show examples for the physical arrangement of the transmit antenna and the receive antenna.

FIG. 5A shows an embodiment for the physical arrangement of the transmit antenna 112' and the receive antenna 118' where the antenna positions have been exchanged in comparison to FIG. 2A. In an alternative implementation, as shown in FIG. 5B, the first and second planes may be perpendicular to each other (compare to FIG. 2B).

In a preferred implementation with the antennae planes either parallel or coplanar as shown in FIG. 5A, the receive antenna 118' loop surrounds the transmit antenna 112' loop. In a manner analogous to that shown and described herein with respect to FIG. 2A, the antennae configuration of FIG. 5A supports magnetic field lines 142'a and 142'b for the transmit antenna 112' that do not induce a signal on the receive antenna 118'. Because no signal is induced by the transmit antenna 112' on the receive antenna 118', the receive circuit 106 can continuously monitor the reader terminal field during transmit circuit 104 operation and thus function to receive signals from the reader terminal and maintain synchronization with the reader terminal without interruption.

Figure 5B:
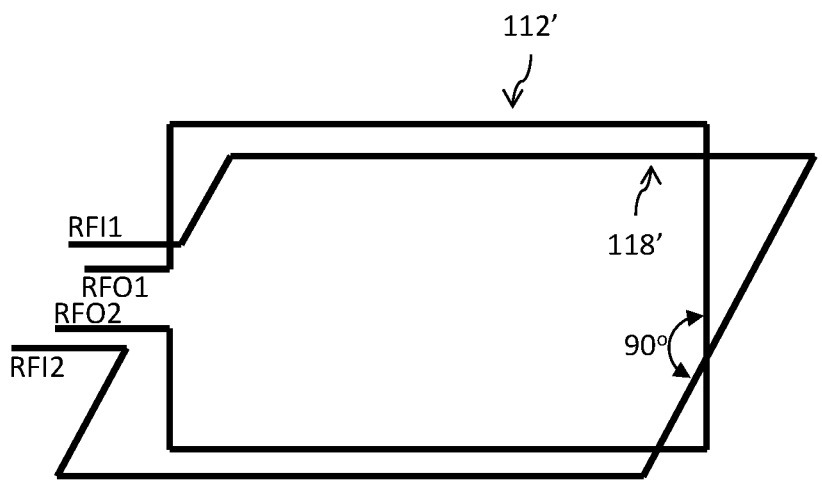

Although FIGS. 5A-5B illustrate a particular implementation where only single turn antennae loops are used, it will be understood that this is just one example. As noted herein with respect to FIGS. 3A-3C, one or the other or both of the included antennae could be implemented as a multi-turn (for example, spiral winding) antenna loop.

The relative size relationship between the antennae of the transponder and the antenna of the reader as shown in FIG. 4 is equally applicable to the implementation of FIGS. 5A and 5B.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A near field communications (NFC) transponder, comprising:
   a transmit circuit having a first output and a second output;
   a receive circuit having a first input and a second input;
   a near field transmit only antenna having a first antenna segment coupled between the first and second outputs of the transmit circuit and a ground node and a second antenna segment coupled between the first and second outputs of the transmit circuit and the ground node; and
   a near field receive only antenna having a first antenna terminal coupled to the first input of the receive circuit and a second antenna terminal coupled to the second input of the receive circuit;
   wherein the first antenna segment carries a first current producing a first magnetic field and the second antenna segment carries a second current producing a second magnetic field;
   wherein the first antenna segment of the near field transmit only antenna extends parallel to a first portion of the near field receive only antenna and wherein the second antenna segment of the near field transmit only antenna extends parallel to a second portion of the near field receive only antenna, the first and second magnetic fields canceling each other so as to not induce a signal on the near field receive only antenna.

2. The NFC transponder of claim 1, wherein the first and second antenna segments for the near field transmit only antenna are formed in a first plane and wherein the near field receive only antenna is formed in a second plane.

3. The NFC transponder of claim 2, wherein the first and second planes are parallel planes.

4. The NFC transponder of claim 2, wherein the first and second planes are coplanar planes.

5. The NFC transponder of claim 1, wherein the first and second outputs of the transmit circuit are directly electrically connected to each other and directly electrically connected to a first antenna terminal of each of the first and second antenna segments.

6. The NFC transponder of claim 1, wherein a second antenna terminal of each of the first and second antenna segments is directly electrically connected to the ground node.

7. The NFC transponder of claim 1, wherein the first and second outputs of the transmit circuit are directly electrically connected to balanced inputs of a balun and an unbalanced output of the balun is directly electrically connected to a first antenna terminal of each of the first and second antenna segments.

8. The NFC transponder of claim 7, wherein a second antenna terminal of each of the first and second antenna segments is directly electrically connected to the ground node.

9. The NFC transponder of claim 1, wherein the near field transmit only antenna is formed in a loop that completely surrounds the near field receive only antenna.

10. The NFC transponder of claim 1, wherein the near field receive only antenna is formed in a loop that completely surrounds the near field transmit only antenna.

11. A near field communications (NFC) transponder, comprising:
    a transmit circuit;
    a receive circuit having a first input and a second input;
    a near field transmit only antenna electrically coupled to an output of the transmit circuit, the near field transmit only antenna having a first antenna segment coupled between the output of the transmit circuit and a ground node and a second antenna segment coupled between the output of the transmit circuit and the ground node;
    wherein the first antenna segment carries a first current producing a first magnetic field and the second antenna segment carries a second current producing a second magnetic field; and
    a near field receive only antenna loop electrically coupled to an input of the receive circuit;
    wherein the first antenna segment of the near field transmit only antenna extends parallel to a first portion of the near field receive only antenna loop and wherein the second antenna segment of the near field transmit only antenna extends parallel to a second portion of the near field receive only antenna loop, the first and second magnetic fields canceling each other so as to not induce a signal on the near field receive only antenna loop.

12. The NFC transponder of claim 11, wherein the first and second antenna segments for the near field transmit only antenna are formed in a first plane and wherein the near field receive only antenna loop is formed in a second plane.

13. The NFC transponder of claim 12, wherein the first and second planes are parallel planes.

14. The NFC transponder of claim 12, wherein the first and second planes are coplanar planes.

15. The NFC transponder of claim 11, further including a balun coupled between the output of the transmit circuit and the near field transmit only antenna.

16. The NFC transponder of claim 11, wherein the near field transmit only antenna is formed in a loop that completely surrounds the near field receive only antenna loop.

17. The NFC transponder of claim 11, wherein the near field receive only antenna loop completely surrounds the near field transmit only antenna.

18. A near field communications (NFC) transponder, comprising:
    a transmit circuit having a first output and a second output;
    a receive circuit having a first input and a second input;
    a near field transmit only antenna having a first antenna segment coupled in series with a second antenna segment between the first and second outputs of the transmit circuit;
    wherein the first antenna segment carries a first current producing a first magnetic field and the second antenna segment carries a second current producing a second magnetic field; and
    a near field receive only antenna having a first antenna terminal coupled to the first input of the receive circuit and a second antenna terminal coupled to the second input of the receive circuit;
    wherein the first antenna segment of the near field transmit only antenna extends parallel to a first portion of the near field receive only antenna and wherein the second antenna segment of the near field transmit only antenna extends parallel to a second portion of the near field receive only antenna, the first and second magnetic fields canceling each other so as to not induce a signal on the near field receive only antenna.

19. The NFC transponder of claim 18,
wherein the first and second antenna segments for the near field transmit only antenna are formed in a first plane and wherein the near field receive only antenna is formed in a second plane, and
wherein the first and second planes are perpendicular planes.

\* \* \* \* \*